(12) United States Patent
Birkholz et al.

(10) Patent No.: US 11,688,900 B2
(45) Date of Patent: Jun. 27, 2023

(54) ENERGY STORAGE MODULE CELL ASSEMBLY INCLUDING POUCH CELL, COMPRESSION ELEMENT, THERMAL PLATE, AND CELL FRAME, AND METHOD FOR ASSEMBLING THE SAME

(71) Applicant: Clarios Advanced Solutions GmbH, Hannover / Niedersachsen (DE)

(72) Inventors: Joerg Birkholz, Sarstedt (DE); Marco Jansen, Celle (DE); Martin Wiegmann, Borstel (DE); Henning Eisermann, Uetze (DE); Ralf Joswig, Buchholz (DE); Benjamin Schwarzien, Gehrden (DE)

(73) Assignee: CLARIOS ADVANCED SOLUTIONS GMBH, Hannover (DE)

( * ) Notice: Subject to any disclaimer, the term of this patent is extended or adjusted under 35 U.S.C. 154(b) by 94 days.

(21) Appl. No.: 16/616,659

(22) PCT Filed: Jun. 1, 2018

(86) PCT No.: PCT/EP2018/064514
§ 371 (c)(1),
(2) Date: Nov. 25, 2019

(87) PCT Pub. No.: WO2018/220199
PCT Pub. Date: Dec. 6, 2018

(65) Prior Publication Data
US 2021/0175562 A1    Jun. 10, 2021

Related U.S. Application Data

(60) Provisional application No. 62/513,600, filed on Jun. 1, 2017.

(51) Int. Cl.
*H01M 10/6554*    (2014.01)
*H01M 10/613*    (2014.01)
(Continued)

(52) U.S. Cl.
CPC ... *H01M 10/6554* (2015.04); *H01M 10/0481* (2013.01); *H01M 10/0525* (2013.01);
(Continued)

(58) Field of Classification Search
CPC .......... H01M 10/6554; H01M 10/613; H01M 10/0481; H01M 10/0525; H01M 10/482
(Continued)

(56) References Cited

U.S. PATENT DOCUMENTS 6,664,006 B1    12/2003  Munshi
7,896,219 B2    3/2011   Scheuerman et al.
(Continued)

FOREIGN PATENT DOCUMENTS

CN    102820448 A    12/2012
CN    104934656 A    9/2015
(Continued)

OTHER PUBLICATIONS

"integrate." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1258459. (Year: 2010).*
(Continued)

*Primary Examiner* — Sean P Cullen
(74) *Attorney, Agent, or Firm* — Christopher & Weisberg, P.A.

(57) ABSTRACT

A cell assembly, having a cell frame, into which bus bars and a thermal plate are integrated, and a lithium-ion pouch cell having a first face and a second face opposite the first face are provided. The pouch cell further includes positive and negative cell terminals arranged at a top end of the pouch cell, and a compression element. The cell frame is config-
(Continued)

ured to receive and house the pouch cell and the compression element in a space defined by the thermal plate and the cell frame.

15 Claims, 5 Drawing Sheets

(51) Int. Cl.
*H01M 10/04* (2006.01)
*H01M 10/0525* (2010.01)
*H01M 10/48* (2006.01)
*H01M 50/296* (2021.01)
*H01M 50/271* (2021.01)
*H01M 50/211* (2021.01)
*H01M 50/569* (2021.01)

(52) U.S. Cl.
CPC ....... *H01M 10/482* (2013.01); *H01M 10/613* (2015.04); *H01M 50/211* (2021.01); *H01M 50/271* (2021.01); *H01M 50/296* (2021.01); *H01M 50/569* (2021.01); *H01M 2220/20* (2013.01)

(58) Field of Classification Search
USPC .................. 429/156, 158, 159, 160, 162
See application file for complete search history.

(56) References Cited

U.S. PATENT DOCUMENTS

| | | | |
|---|---|---|---|
| 2004/0185332 A1 | 9/2004 | Botos | |
| 2011/0059347 A1* | 3/2011 | Lee ................... | H01M 10/6555 429/120 |
| 2012/0003520 A1* | 1/2012 | Lee ..................... | H01M 50/509 429/83 |
| 2012/0045681 A1 | 2/2012 | Klaus et al. | |
| 2012/0129024 A1* | 5/2012 | Marchio ............... | H01M 10/48 429/87 |
| 2012/0315531 A1 | 12/2012 | Lev | |
| 2013/0164585 A1 | 6/2013 | Kwak et al. | |
| 2013/0189554 A1 | 7/2013 | Schmieder et al. | |
| 2013/0306353 A1* | 11/2013 | Zhao .................... | H01M 50/502 174/133 B |
| 2015/0303412 A1 | 10/2015 | Lee et al. | |
| 2016/0111691 A1 | 4/2016 | Garascia et al. | |
| 2016/0133898 A1* | 5/2016 | Choi ................... | H01M 10/658 429/151 |
| 2016/0133997 A1 | 5/2016 | Vejalla et al. | |
| 2016/0197328 A1 | 7/2016 | Mack | |
| 2017/0018746 A1 | 1/2017 | Kritzer et al. | |
| 2017/0040653 A1 | 2/2017 | Morris et al. | |
| 2017/0294634 A1 | 10/2017 | Choi et al. | |
| 2018/0026296 A1 | 1/2018 | Kruger et al. | |
| 2018/0159096 A1* | 6/2018 | Kim ..................... | B23K 26/21 |
| 2018/0212215 A1* | 7/2018 | Park .................... | H01M 50/569 |
| 2021/0175562 A1 | 6/2021 | Birkholz et al. | |

FOREIGN PATENT DOCUMENTS

| | | | | |
|---|---|---|---|---|
| CN | 204793110 U | | 11/2015 | |
| CN | 105591048 A | | 5/2016 | |
| DE | 102013021549 A1 | * | 6/2015 | .......... H01M 10/613 |
| EP | 2720301 A2 | | 4/2014 | |
| GB | 2535546 A | * | 8/2016 | .......... H01M 50/502 |
| GB | 2535546 A | | 8/2016 | |
| KR | 2016-0012021 A | | 2/2016 | |
| WO | 2016131141 A1 | | 8/2016 | |
| WO | WO-2016131141 A1 | * | 8/2016 | .......... H01M 10/647 |
| WO | WO-2017082528 A1 | * | 5/2017 | ............. B23K 26/21 |

OTHER PUBLICATIONS

"Pre-." In New Oxford American Dictionary, edited by Stevenson, Angus, and Christine A. Lindberg. : Oxford University Press, 2010. https://www.oxfordreference.com/view/10.1093/acref/9780195392883. 001.0001/m_en_us1280156. (Year: 2010).*
International Search Report and Written Opinion of the International Searching Authority dated Oct. 5, 2018 issued in PCT Application No. PCT/EP2018/064514, consisting of 10 pages.
International Search Report and Written Opinion of the International Searching Authority dated Jul. 11, 2019 issued in PCT Application No. PCT/EP2018/064516, consisting of 20 pages.

* cited by examiner

ENERGY STORAGE MODULE CELL ASSEMBLY INCLUDING POUCH CELL, COMPRESSION ELEMENT, THERMAL PLATE, AND CELL FRAME, AND METHOD FOR ASSEMBLING THE SAME

CROSS-REFERENCE TO RELATED APPLICATIONS

This application is a Submission Under 35 U.S.C. § 371 for U.S. National Stage Patent Application of International Application No.: PCT/EP2018/064514, filed Jun. 1, 2018 entitled "CELL ASSEMBLY, CELL SUB-MODULE, ENERGY STORAGE MODULE AND METHOD FOR ASSEMBLING THE SAME," which claims priority to U.S. Provisional Application No. 62/513,600, filed Jun. 1, 2017, entitled "POUCH CELL ARRANGEMENT AND CONTACTING IN 12V LITHIUM-ION STARTER BATTERY," the entireties of both of which are incorporated herein by reference.

The present disclosure relates generally to the field of energy storage cells and energy storage modules, in particular a lithium-ion starter battery. More specifically, the present disclosure relates to lithium-ion cell assemblies that may be used in vehicular contexts, as well as other energy storage/expending applications. Furthermore, the present disclosure relates to a method for manufacturing/assembling such cell assemblies, cell sub-modules, and energy storage modules, respectively.

This section is intended to introduce the reader to various aspects of the art that may be related to various aspects of the present disclosure, which are described and/or claimed below. The discussion is believed to be helpful in providing the reader with background information to facilitate a better understanding of the various aspects of the present disclosure. Accordingly, it should be understood that these statements are to be read in this light and not as admissions of prior-art.

A vehicle generally refers to any means of transportation using one or more battery system for providing a starting power and/or at least a portion of a motion power for the vehicle. The vehicle may refer to a motor-powered and/or electrically powered vehicle such as an air- or watercraft, a rail-guided vehicle, or preferably a street vehicle. The street vehicle may in particular refer to cars, trucks, buses or recreational vehicles.

In vehicles, different types of batteries are used, such as traction batteries (especially for electric or hybrid electric vehicles) and starter batteries. In automotive applications, a starter battery is used for providing the necessary energy/power required for starting a vehicle. In more detail, a starter battery generally refers to a battery or energy storage module, which provides at least a portion of the energy/power, preferably the total energy/power, required when starting a vehicle and/or required for providing power to vehicle-internal electrical systems (such as, e.g., lights, pumps, ignition and/or alarm systems).

Conventionally, 12 Volt (V) lead-acid batteries are used as starter batteries for vehicles. However, lead-acid batteries have a rather heavy weight, in particular, due to their low energy densities. Quite to the contrary, lithium-ion energy storage modules are known for their high energy densities. In addition, lithium-ion energy storage modules have, for example, a longer service life, less self-discharge, improved rapid charging capability and shorter maintenance intervals than conventional lead-acid batteries. However, the lithium-ion chemistry has different needs and requirements as the conventional lead-acid battery.

As battery technology evolves, there is a need to provide improved power sources, particularly energy storage modules for vehicles. For example, lithium-ion batteries or battery cells tend to be very susceptible to heating or overheating, which may negatively affect components of the energy storage module. Also, lithium-ion batteries or battery cells tend to be very sensitive with respect to overcharging and deep-discharging of the respective cells or battery.

Accordingly, an objective of the present application is to provide a cell assembly, a cell sub-module and an energy storage module, which overcome the disadvantages of the conventional systems, and which are at the same time easy to manufacture, economical and versatile, and which can be easily adapted and assembled, while meeting the specific demands posed by a lithium-ion battery chemistry. A further objective is to provide a method for assembling such an energy storage module, in an easy, flexible and cost efficient manner.

These objectives are solved by a cell assembly, a cell-sub-module, an energy storage module and a method for assembling the same according to the independent claims. Advantageous embodiments are defined in the dependent claims.

In more detail, the objective is solved by a cell assembly comprising a cell frame, into which bus bars and a thermal plate are integrated. The cell assembly further comprises a lithium-ion pouch cell comprising a first face and a second face opposite the first face, wherein the pouch cell further comprises positive and negative cell terminals arranged at a top end of the pouch cell, and a compression element, wherein the cell frame is configured to receive and house the pouch cell and the compression element in a space defined by the thermal plate and the cell frame.

The inventive proposal to form the cell assembly such that the lithium-ion pouch cell and the compression element are received in a space defined by the cell frame and the integrated thermal element achieves an exceptionally compact design of the cell assembly, which can be realized easily and with only few standard components. Furthermore, the thermal management of the cell assembly can be ensured in a reliable way by means of a (rather) large contact surface between the lithium-ion pouch cell and the thermal plate.

According to another aspect, the bus bars and the thermal plate can be in-molded in the cell frame, which is preferably made of a polymeric material, which increases the stability of the cell frame-bus bars-thermal plate arrangement and provides an easy and precise way for arranging the bus bars and thermal plate in the cell frame.

According to another aspect, a bottom portion of the thermal plate can extend through a bottom wall of the cell frame, wherein the bottom portion of the thermal plate is preferably configured to contact a thermal management feature. This ensures structural integrity of the cell frame and also enhances the thermal management of the cell assembly.

According to another aspect, the cell terminals of the pouch cell can be pre-bent such as to contact the bus bars. Thereby, the electrical conduct can be ensured in an easy and cost efficient manner.

According to another aspect, the pouch cell can be secured to the thermal plate by means of a supported or non-supported adhesive layer, which is at least partially applied on the thermal plate, preferably a glue layer. Thus, the pouch cell can securely arranged in a simple manner.

According to another aspect, the compression element can comprise at least one foam layer.

According to another aspect, the cell frame can comprise geometric features for supporting appropriate placement of the cell terminals.

In an embodiment, the geometric features can comprise recesses, which comprise a shape corresponding to the cell terminals of the pouch cell. Thereby, the arrangement and positioning of the pouch cell in the frame is simplified.

According to another aspect, the bus bars can further comprise a Cu-bus bar for coupling to a negative terminal of the pouch cell and an Al-bus bar for coupling to a positive terminal of the pouch cell.

According to another aspect, the cell terminals can be welded to the bus bars, preferably laser welded to the bus bars. Thereby, enhancing the electrical conductivity between the cell terminals and the bus bars by a tight contact.

Furthermore, the objective of the present application is solved by a cell sub-module according to claim 11, which comprises at least two cell assemblies as described above, in particular three cell assemblies as described above, wherein the at least two cell assemblies are stacked such that the thermal plate of a first cell assembly contacts the compression element of an adjacent cell assembly and such that the cell terminals of each cell assembly are arranged on a first side of the cell sub-module.

According to another aspect, the cell sub-module comprises three cell assemblies.

Moreover, an energy storage module is provided which comprises a housing having a thermal management feature, a plurality of cell sub-modules as described above, which is arranged in the housing, wherein the housing comprises a plurality of cavities, each configured to receive a corresponding one of the plurality of cell sub-modules, the cavities being defined either by at least one wall of the housing and an internal partition of the housing or by at least two internal partitions of the housing.

The inventive proposal to form an energy storage module of a plurality of cell sub-modules each comprising two or more cell assemblies, achieves a highly versatile product. In more detail, the desired qualities (e.g. total voltage, total capacity, energy density etc.) of the energy storage module can be easily and cost efficiently adapted by providing a corresponding amount of cell sub-modules having a respective number of cell assemblies.

According to another aspect, the (aligned) bus bars of two adjacent cell sub-modules are connected to each other by means of a bimetallic plate such that the two adjacent cell sub-modules are electrically connected in series, wherein the respective cell assemblies of each cell sub-module are simultaneously electrically connected in parallel to each other. Thereby, a simple way of electrically connecting the respective cell sub-modules and cell assemblies is provided.

According to another aspect, the bimetallic plate comprises a Cu-portion for connecting to the Cu-bus bar of the negative terminal and Al-portion for connecting to the Al-bus bar of the positive terminal. Thus, welding of the portions of the bimetallic plate to the respective positive and negative bus bars is simplified, which leads to a better electrical connectivity and reduced manufacture costs.

According to another aspect, the energy storage module can further comprise a sense line for measuring the voltage of a cell assembly, and/or of one or more cell sub-module of the plurality of cell sub-modules. Thus, the operation of the cell assemblies and/or cell sub-modules can be monitored and defects or malfunctions can be detected more easily.

According to another aspect, the sense line further comprises at least one temperature sensor integrated into the sense line, which increases the operation security of the energy storage module as, e.g., a thermal runaway can be detected swiftly.

According to another aspect, the housing of the energy storage module is closable or closed by means of a cover element.

According to another aspect, the energy storage module is a 12 Volt lithium-ion starter battery comprising four cell sub-modules, each cell sub-module preferably comprising three cell assemblies.

Moreover, the objective of the present application is also solved by a method for assembling an energy storage module as described above, which comprises the steps of: providing a plurality of cell sub-modules, preferably four cell sub-modules, each comprising at least two, in particular three, cell assemblies; arranging each cell sub-module into a corresponding cavity of the battery housing; and electrically connecting the plurality of cell sub-modules in series by means of a plurality of bimetallic plates, which simultaneously electrically connects the at least two cell assemblies in parallel. Thus, the cell assemblies of a cell sub-module, and the cell sub-modules of the energy storage module can be electrically connected in a simplified manner, which reduces manufacture cost and time necessary for assembly.

According to another aspect, the bimetallic plates are welded, in particular laser welded or ultrasonically welded, to the plurality of bus bars integrated in the cell frame and electrically connected to the corresponding terminals of the corresponding pouch cell.

According to another aspect, positive and negative end connection pieces are welded, in particular laser welded or ultrasonically welded, to respective positive and negative cell terminals of the two end cell sub-modules of the energy storage module for electrically coupling to respective main terminals of the energy storage module.

These and other features, aspects and advantages of the present disclosure will become better understood when the following detailed description is read with reference to the accompanying drawings in which like characters represent like parts throughout the drawings, wherein.

It should be noted that terms such as "above", "below", "on top of", and "beneath" may be used to indicate relative positions for elements (e.g., stacked components of the cell sub-module 100 and energy storage module 1000 described below) and are not limiting embodiments to either of a horizontal or vertical stack orientation. Further, it should be noted that terms such as "above", "below", "proximate", or "near" are intended to indicate the relative positions of two layers in the stack that may or may not be in direct contact with one another.

Also, terms such as "top", "bottom", and "side" are configured to describe relative position with respect to the cell assembly 1, cell sub-module 100 and/or energy storage module 1000 in the mounted state (e.g. when mounted in a vehicle).

Additionally, the geometric references are not intended to be strictly limiting. For example, the use of the term "perpendicular" does not require an exact right angle, but defines a relationship that is substantially perpendicular, as would be understood by one of ordinary skill in the art. Similarly, for example, the term "parallel" used in reference to geometric relationships does not require a perfect mathematical relationship, but indicates that certain features are generally extending in the same directions. Additionally, the term "planar" is used to describe features that are substantially flat that does not require perfect mathematical planarity.

In more detail, "substantially parallel" and "substantially planar" means that an angle between ±10°, preferably ±5°, most preferably ±2° to an exact parallel or planar orientation are considered as substantially parallel or substantially planar. In the same sense, a "substantially perpendicular" or "substantially right" angle is considered as an angle of 80° to 110°, preferably 85° to 95°, most preferably 88° to 92°.

Lithium-ion battery systems such as used in automotive applications, may be used in conjunction with or as a replacement for lead-acid batteries traditionally used in vehicles.

Described herein are various embodiments and design features of lithium-ion cell assemblies 1 and cell sub-modules 100 which may be arranged in a lithium-ion energy storage module 1000 for use in an automobile or other motive environments.

Those cell assemblies 1, cell sub-modules 100 and energy storage modules 1000 can also be used in various different environments, e.g. recreational purposes (e-bikes, scooters etc.) and so forth.

Figure 1A:
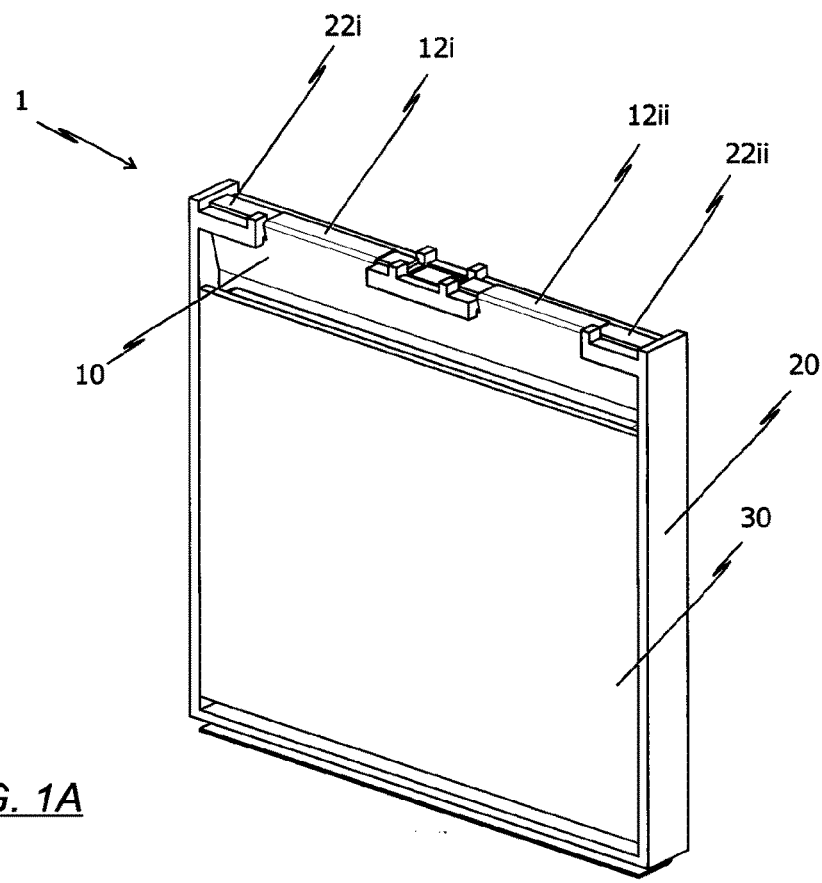
FIG. 1A is a perspective view of a cell assembly.
Figure 1B:
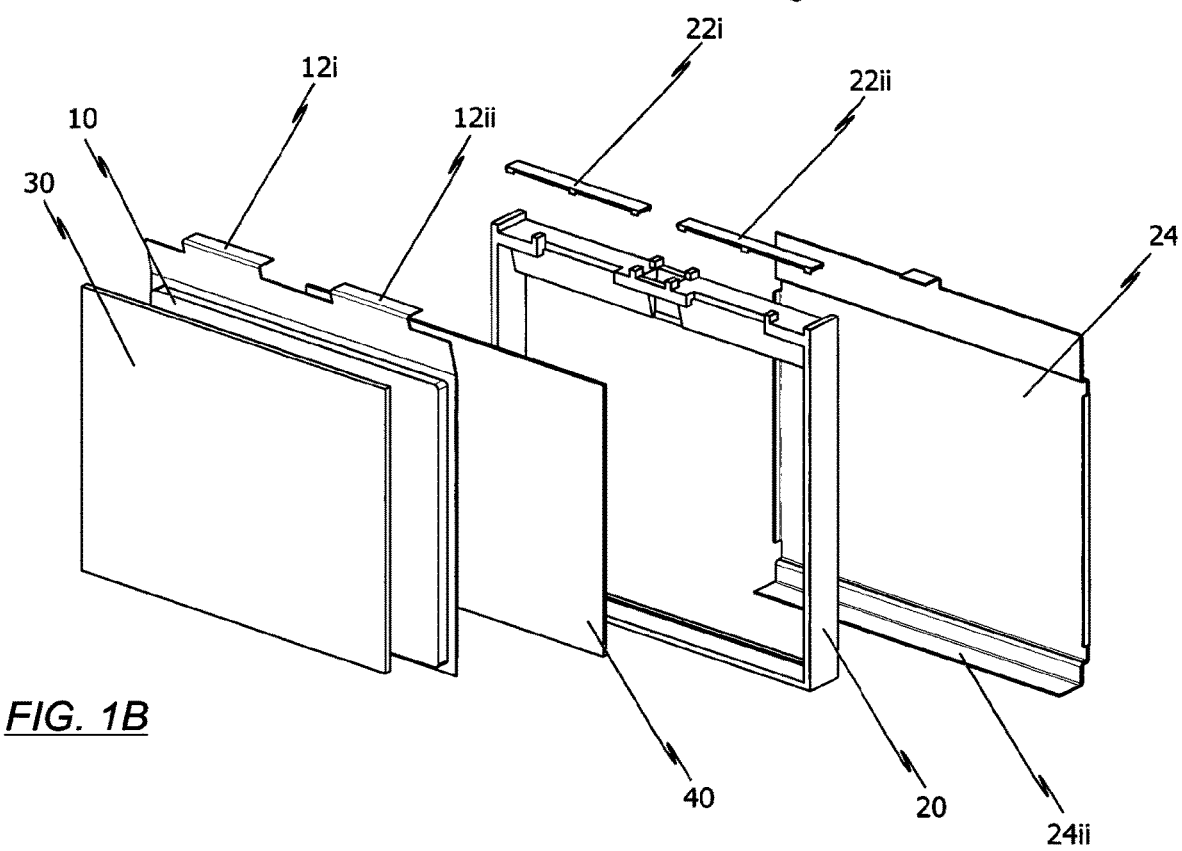
FIG. 1B is an exploded view of the cell assembly.

A perspective view of an embodiment of a cell assembly 1 is shown in FIG. 1A, along with the constituent layers of the cell assembly 1 which are shown in an exploded view in FIG. 1B.

Therein, the cell assembly 1 includes a cell frame 20 for housing at least a lithium-ion pouch cell 10 and a compression element 30.

The cell frame 20 preferably comprises four walls defining a space for receiving the pouch cell 10 and the compression element 30. In more detail, the cell frame 20 can comprise a top wall, a bottom wall opposite the top wall and two side walls connecting the top wall and bottom wall at respective ends. The top wall may be configured with recesses in order to receive and arrange cell terminals 12*i* 12*ii* of the lithium-ion pouch cell 10.

The cell frame 20 can be made of a polymeric material such as for example polyethylene, polypropylene, polyamide, polyimide, acrylnitril-butadien-styrol etc. and combinations thereof.

Bus bars 22*i*, 22*ii* for coupling to a respective terminal of the lithium ion pouch cell 10 and a thermal plate 24 for thermal management purposes can be in-molded into the cell frame 20. In some embodiments, the bus bars 22*i*, 22*ii* can be received in the top wall of the cell frame 20. Moreover, the top wall of the cell frame 20 may be provided with gripping features (e.g. a slot) in which the thermal plate 24 is arranged (e.g. the thermal plate 24 may be in-molded into the cell frame 20).

The lithium-ion pouch cell 10 can be secured to the thermal plate 24 using an adhesive 40. The adhesive 40 can be provided in form of an adhesive layer, a supported or non-supported transfer tape layer, or by means of adhesive portions provided only at selective portions of the thermal plate 24.

The thermal plate 24 can be made of a thermally conductive material, in particular, a metal like aluminum, magnesium, copper, etc. In an embodiment, the thermal plate 24 can be made of aluminum and the surface facing the pouch cell 10 can be coated with aluminum oxide, which is electrically insulative.

The pouch cell 10 may include an outer electrically insulating layer (e.g. a polyimide film or another suitable electrically insulating polymer). Additionally, the pouch cell 10 may also include a metallic foil layer (e.g., an aluminum foil layer, or an aluminum oxide foil layer that may provide enhanced structural integrity to be more resilient to pin holes deformities, to provide a better gas barrier layer, and so forth, compared to the use of insulating polymer films alone). Further, the pouch cell 10 can include an inner electrically insulating layer (e.g., a polyimide film or another suitable electrically insulating polymer) to electrically isolate the metallic foil layer from the internal components of the pouch cell 10. The above-described layers can be individually applied to the pouch cell 10 or may be provided as a single film including the layers, which may be collectively referred to as pouch material film.

The pouch material film may be sealed (e.g., sonically welded, sealed with epoxy, or another suitable seal) around the cell terminals 12*i*, 12*ii* to isolate the internal components of the pouch cell 10.

Inside the pouch cell 10, a positive cell terminal 12*i* may be electrically coupled to one or more cathode layers while the negative cell terminal 12*ii* may be electrically coupled to one or more anode layers. In certain embodiments the coupled layers may be made from an aluminum plate that are coated with a cathode active material (e.g., including a lithium metal oxide such as lithium nickel cobalt manganese oxide (NMC) (e.g., $LiNiCoMnO_2$), lithium nickel cobalt aluminum oxide (NCA) (e.g., $LiNiCoAlO_2$), or lithium cobalt oxide (LCO) (e.g., $LiCoO_2$). In certain embodiments the anode layers may be made from copper plates that are coated with an anode active material (e.g., including graphite or graphene). It should be appreciated that these materials are merely provided as examples and that the present approach may be applicable to a number of differently lithium-ion and nickel metal hydride battery modules.

The at least one cathode layer and the at least one anode layer are configured to form an electrochemical stack which may be implemented as a "jelly roll", wherein the positive cell terminal 12*i* and the at least one cathode layer may be formed from a single continuous strip of aluminum foil and the negative cell terminal 12*ii* and the at least one anode layer may be formed from a single, continuous strip of copper foil. For such an implementation, the aluminum foil strip and the copper foil strip may be stacked, along with a number of electrically insulating layers and wound to provide the electrochemical stack. In more detail, the aluminum foil strip and the copper foil strip may be stacked along with a number of electrically insulating layers and wound about a mandrel to provide the electrochemical stack.

Furthermore, an electrolyte (e.g., including carbonate solvents and $LiPeF_6$ as salt) is provided in the pouch cell 10. However, the present invention is not limited by a solvent (aqueous) electrolyte. Rather, a non-aqueous electrolyte can be used instead.

The negative cell terminal 12*ii* and the positive cell terminal 12*i* are preferably arranged on the same side of the pouch cell 10, and spaced apart from each other by a predetermined distance. In more detail, the cell terminals 12i, 12ii, which can be provided in form of tabs, may be pre-bent in order to accommodate securement to the bus bars 22i, 22ii integrated into the cell frame 20, as illustrated, e.g., in FIG. 1B.

The compression element 30 is arranged at a second planar face of the pouch cell 10, which is opposite to a first planar face of the pouch cell 10 contacting the thermal plate 24 via the adhesive 40. The compression element 30 can be formed as a foam layer. The compression element 30 helps to accommodate differences in sizes between the pouch cells 10 and furthermore serves to provide a minimum amount of compression such that the pouch cell 10 and the thermal plate 24 contact each other firmly; thus enhancing the thermal conduct.

Accordingly, the compression element 30 can equalize at least to some extent cell tolerances existing when manufacturing lithium-ion pouch cells 10.

The cell assembly 1 as shown in FIGS. 1A and 1B can be assembled or manufactured by inserting the thermal plate 24 and the bus bars 22i, 22ii into a molding tool, molding the cell frame 20 such as to integrate the bus bars 22i, 22ii and the thermal plate 24 into the cell frame 20, and applying an adhesive 40 at least partially to the surface of the thermal plate 24 facing the space for receiving the pouch cell 10 and the compression element 30. Then, the pouch cell 10 is inserted into the space such that the respective cell terminals 12i, 12ii are received by recesses formed in the cell frame 20, preferably in the top wall of the cell frame 20.

The cell terminals 12i, 12ii may be bent at approximately a right angle such that they can easily be connected to the respective bus bars 22i, 22ii.

In some embodiments, the terminals can be pre-bent to an angle slightly less than 90° (e.g. 85°, 83° or 80°) such that the terminals are pressed to the bus bars 22i, 22ii by an elastic force, while the pouch cell 10 can still be easily inserted into the cell frame 20. Thereby, the electrical conductivity between the cell terminals 12i, 12ii and the bus bars 22i, 22ii is enhanced.

Then, a compression element 30 is inserted into the space of the cell frame 20. The compression element 30 can be provided as a cut sheet of a foam material. The compression element 30 can be secured in the cell frame 20 by means of an adhesive and/or by means of pressing the compression element 30 into the frame to form a press fit. Respective retaining features can therefore be provided in the cell frame 20 (e.g. in the sidewalls of the cell frame 20) in order to hold and retain the compression element 30 in the space.

Alternatively, the compression element 30 could also be formed on the pouch cell 10 by directly applying the foam layer to the pouch cell 10. In other words, by foaming the compression element 30 on the pouch cell 10.

An exemplary compression element 30 could be made of a polyurethane, polypropylene, a polyethylene, a polystyrene, a polyethylene terephthalate material.

Then, each cell terminal 12i, 12ii can be secured to the corresponding bus bar 22i, 22ii by means of laser-welding or ultrasonically welding.

Figures 2A, 2B:
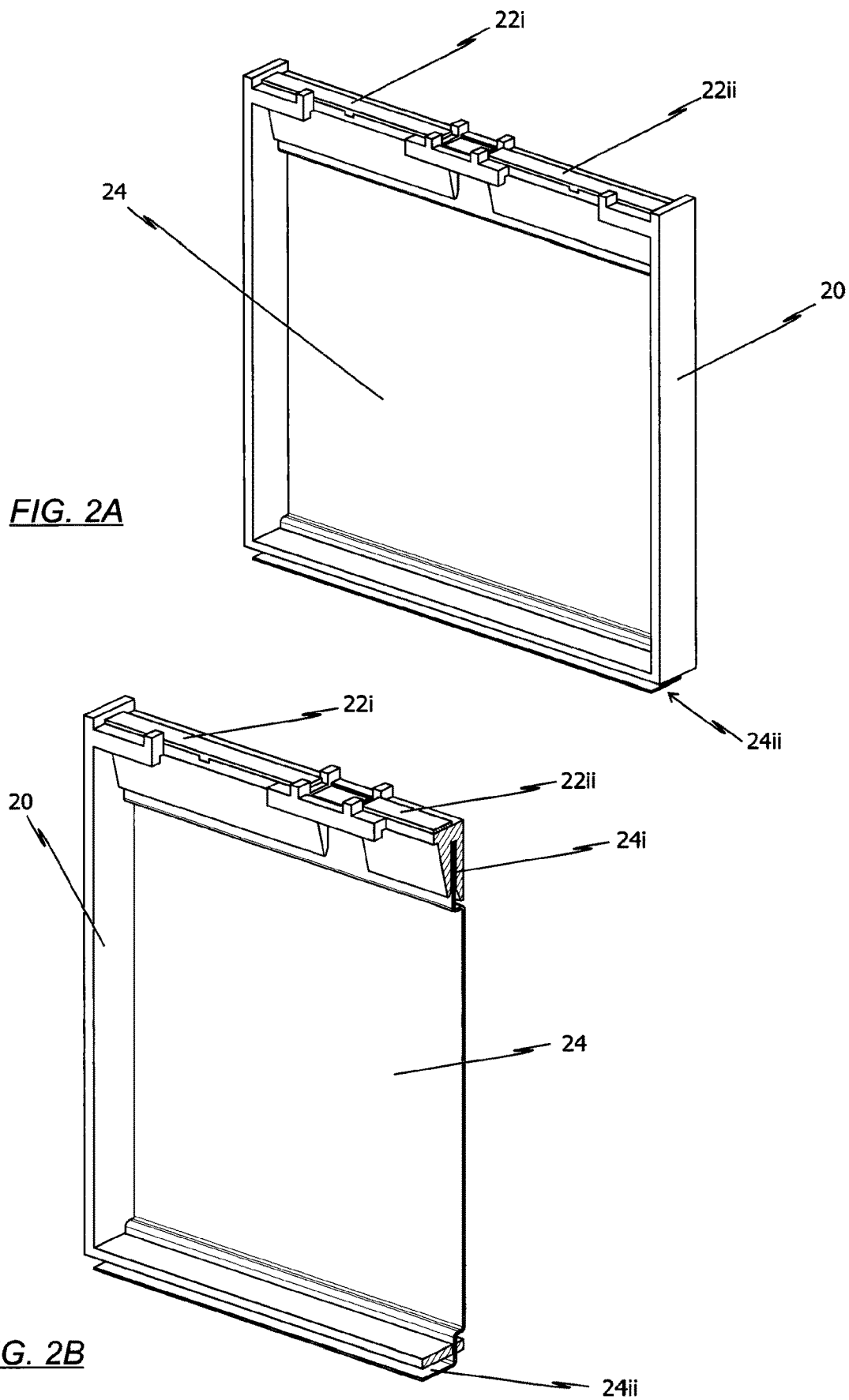
FIG. 2A is a detailed view of a cell frame, bus bars and a thermal plate of the cell assembly.
FIG. 2B is a cross-sectional view of the cell frame, bus bars and thermal plate as shown in FIG. 2A.

FIG. 2A shows a more detailed view of the cell frame 20 and the thermal plate 24, which can be provided in form of a metal sheet, a metal oxide sheet or a combination thereof (e.g. a sheet made of aluminum coated with aluminum oxide).

As shown in FIG. 2A, the cell frame 20 can be made of a polymeric material and may include geometrical features to support appropriate placement of the cell terminals 12i, 12ii. In more detail, the top wall of the cell frame 20 can comprise two recesses configured to receive a respective cell terminal 12i, 12ii.

As illustrated in FIG. 2A, the bus bars 22i, 22ii and the thermal plate 24 are integrated into the cell frame 20. In more detail, the bus bars 22i, 22ii and the thermal plate 24 can be in-molded or over-molded by the cell frame 20. In an embodiment, the bus bars 22i, 22ii are in-molded into the top wall of the cell frame 20.

FIG. 2B shows in a cross-sectional view of the cell frame 20 with in-molded bus bars 22i, 22ii and thermal plate 24. As shown in FIG. 2B, the thermal plate 24 may extend through the bottom wall of the cell frame 20 and may be bent at an approximately right angle such as to form a two-dimensional bottom portion 24ii parallel to and substantially covering the bottom wall of the cell frame 20. The bottom portion 24ii of the thermal plate 24 is configured for contacting a thermal management feature 50i of an energy storage module 1000. Thereby, heat can be conducted to and from the pouch cell 10 very efficiently from or to the thermal management feature 50i of the energy storage module 1000.

The top wall of the cell frame 20 can be over-molded on the thermal plate 24 such that a top portion 24i of the thermal plate 24 is received in a slot formed in the top wall of the cell frame 20. In some embodiments, one or more apertures or undercuts may be provided in the top portion 24i of the thermal plate 24 such that portions of the top wall of the cell frame 20 are molded and extend through the apertures in order to provide a secure grip of the thermal plate 24 in the cell frame 20.

The top wall of the cell frame 20 is configured to receive the bus bars 22i, 22ii of the cell assembly 1, e.g. by means of in-molding or over-molding. In some embodiments, a first (positive) bus bar 22i for contacting the positive cell terminal 12i of the pouch cell 10 can be made of aluminum, and a second (negative) bus bar 22ii for contacting the negative cell terminal 12ii of the pouch cell 10 can be made of copper.

Figure 3:
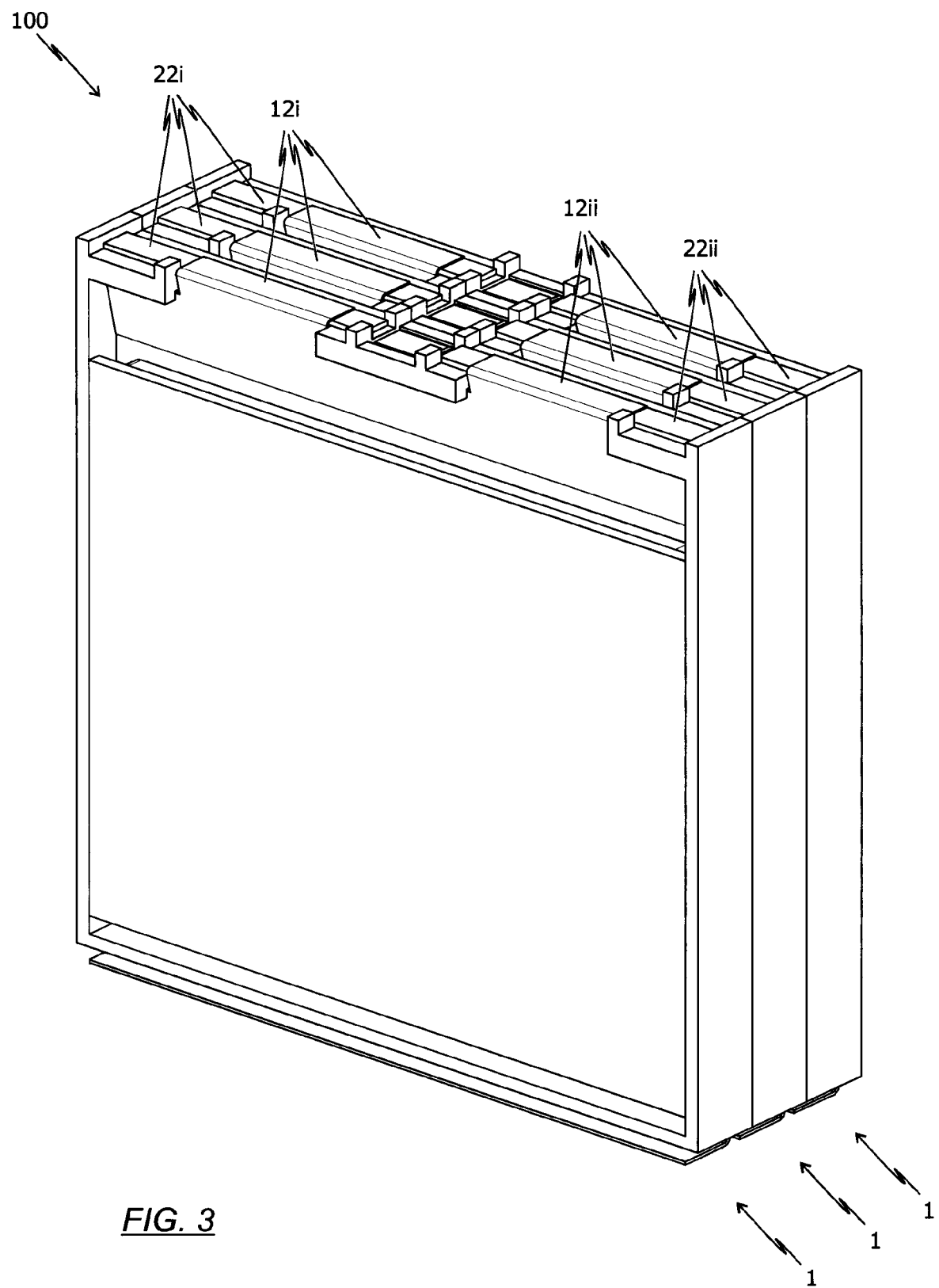
FIG. 3 is a perspective view of a cell sub-module.

FIG. 3 shows a perspective view of a stack of cell assemblies 1, which produces a cell sub-module 100. Therein, three cell assemblies 1 are arranged in a stack such that the cell terminals 12i, 12ii of a first cell assembly 1 substantially align with the cell terminals 12i, 12ii of an adjacent cell assembly 1. The three cell assemblies 1 are stacked such that the thermal plate 24 of a first cell assembly 1 faces and preferably contacts the compression element 30 of a second adjacent cell assembly 1.

Each cell assembly 1 is preferably arranged such that all negative cell terminals 12ii and corresponding negative bus bars 22ii are aligned and all positive cell terminals 12i and corresponding positive bus bars 22i are aligned with each other. Thereby, the cell-assemblies of the cell sub-module 100 can be connected in parallel more easily.

Although only a cell-submodule 100 having three cell assemblies 1 is shown in the FIG. 3, a cell-submodule 100 may comprise any suitable number of cell assemblies 1 greater than or equal to two cell assemblies 1, which result in a desired requirement of the cell sub-module 100 (e.g., total voltage or total capacity of the cell sub-module 100).

A plurality of such cell sub-modules 100 is configured to form an energy storage module 1000. In more detail, at least two, e.g. four, cell sub-modules 100 are arranged into a casing of an energy storage module 1000.

The casing comprises a housing 50 having internal partitions 52 in order to form respective cavities for receiving a corresponding one of the at least two cell sub-modules 100 and a cover element 80 for closing the housing 50.

Figure 4A:
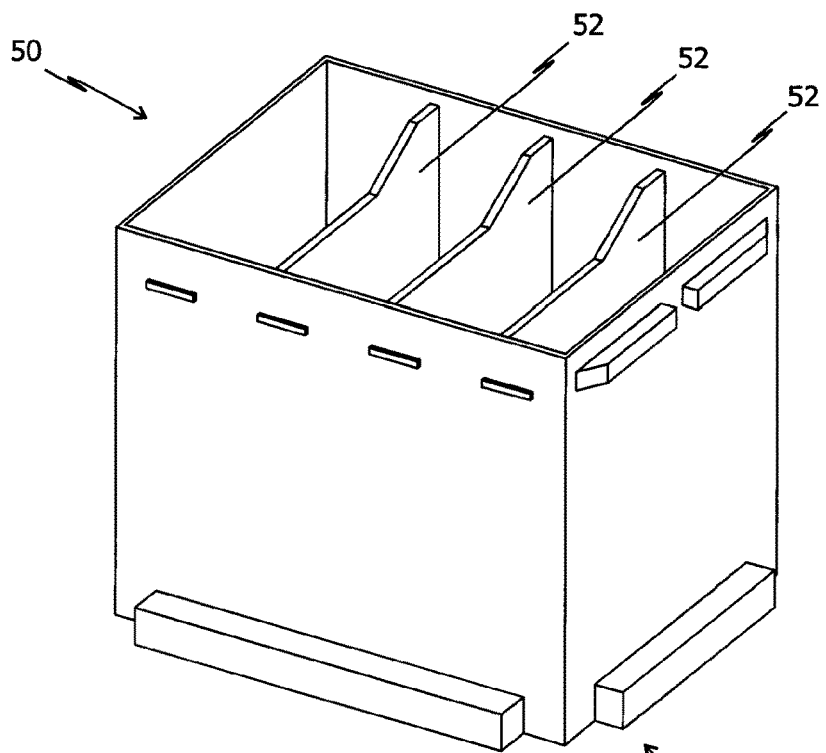
FIG. 4A is a perspective view of the battery housing.
Figure 4B:
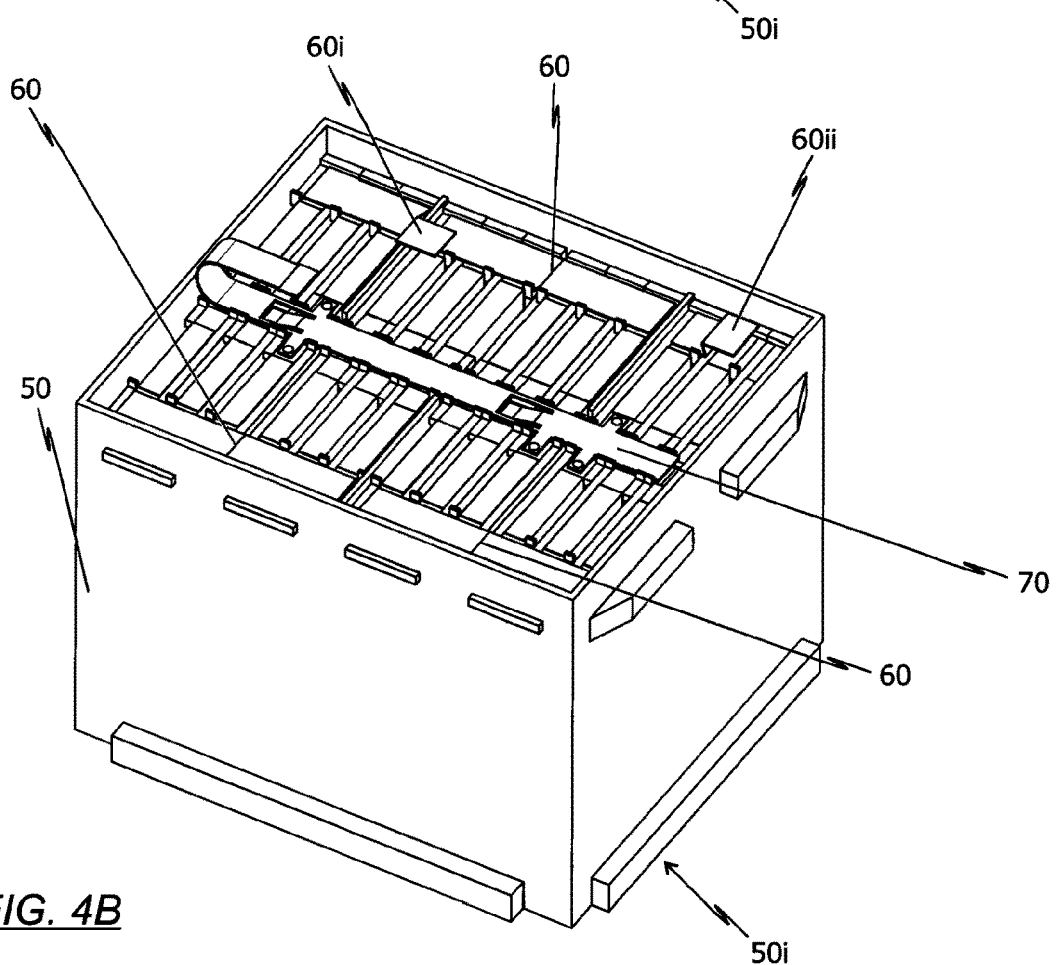
FIG. 4B is a perspective view of the battery housing receiving a plurality of cell sub-modules.

As shown in FIGS. 4A and 4B, the housing 50 includes a plurality of cavities to enable placement and securement of a corresponding number of cell sub-modules 100 in the housing 50. The cavities are formed by a plurality of internal partitions 52 in the housing 50. The housing 50 may also include the thermal management feature 50i, which can be provided as a heat sink or cold plate to enable passive cooling of the battery cells. Once the cell sub-modules 100 are positioned in the case, the cell sub-modules 100 may be electrically connected using bimetallic plates 60.

In more detail, FIG. 4A shows an exemplary housing 50 of an embodiment of the present application. In this regard, the housing 50 comprises four side walls, three internal partitions 52 defining four cavities for receiving a respective cell sub-module 100. Furthermore, the thermal management feature 50i is provided at the bottom of the housing 50 to close and seal the bottom of the housing 50. The thermal management feature 50i may be a metallic heat sink, e.g. an aluminum heat sink, to support passive cooling of the respective cell sub-modules 100 and thereby of the respective cell assemblies 1.

FIG. 4B shows the housing 50 of FIG. 4A, wherein four cell sub-modules 100 are placed within each corresponding cavity. Each cell sub-module 100 may be fixed by means of the internal partitions 52 and/or an epoxy layer or a thermal paste provided on the thermal management feature 50i.

In FIG. 4B, the cell sub-modules 100 are arranged such that the negative cell terminals 12ii and negative bus bars 22ii of a first cell sub-module 100 join or align with the positive cell terminals 12i and positive bus bars 22i of a second adjacent cell sub-module 100.

The plurality of cell sub-modules 100 can then be electrically coupled by means of a plurality of bimetallic plates 60, which are configured to connect two adjacent cell sub-modules 100. In more detail, the bimetallic plate 60 comprises a first portion made of copper and a second portion made of aluminum, wherein the first portion contacts the negative cell bus bars 22ii of a first cell sub-module 100 and the second portion contacts the positive bus bars 22i of a second adjacent cell sub-module 100. Thus, the cell sub-modules 100 are connected in series with each other, whereas the cell assemblies 1 of each cell sub-module 100 are simultaneously connected in parallel.

The bimetallic plates 60 may be welded to the cell bus bars 22i, 22ii by laser welding.

Moreover, a positive end connection piece 60i and a negative end connection piece 60ii are provided for electrically connecting the series-connected cell sub-modules 100 with respective positive and negative main terminals 82i, 82ii of the energy storage module 1000. In this regard, the negative end connection piece 60ii can be connected to the negative bus bar 22ii of the first cell assembly 1, and the positive end connection piece 60i can be connected to the positive bus bar 22i of the last (in the embodiment of FIG. 4B, the fourth) cell assembly 1.

The main terminals 82i, 82ii are provided in the cover element 80 for connection to electronics.

A sense line 70 may be connected and secured to the cell sub-modules 100, wherein the sense line 70 includes voltage and temperature sense features.

Figure 5A:
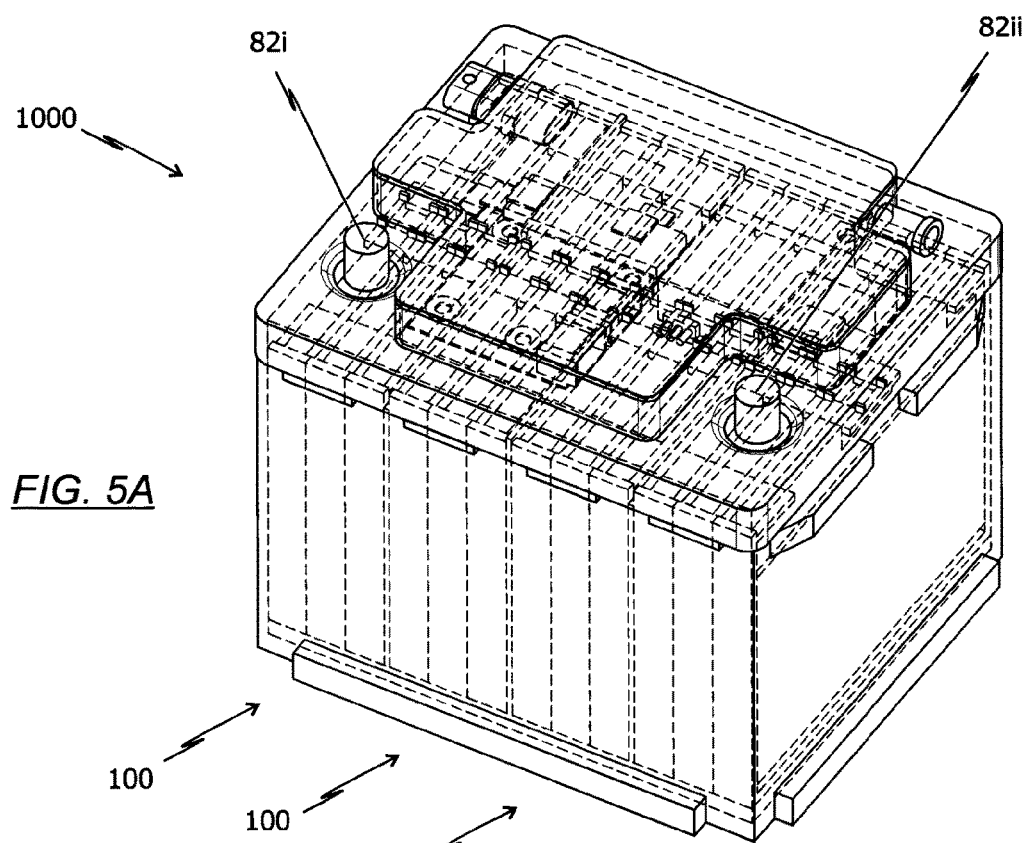
FIG. 5A is an illustrative view of an energy storage module wherein the casing is depicted in a transparent way.

FIG. 5A is a perspective view of the energy storage module 1000 once assembled, wherein the housing 50 and the cover element 80 of the energy storage module 1000 is transparent in order to illustrate the internal components of the energy storage module 1000. As shown, the energy storage module 1000 includes various electronics such as a control module, a relay, signal harness and so forth positioned above the cell sub-modules 100.

Figure 5B:
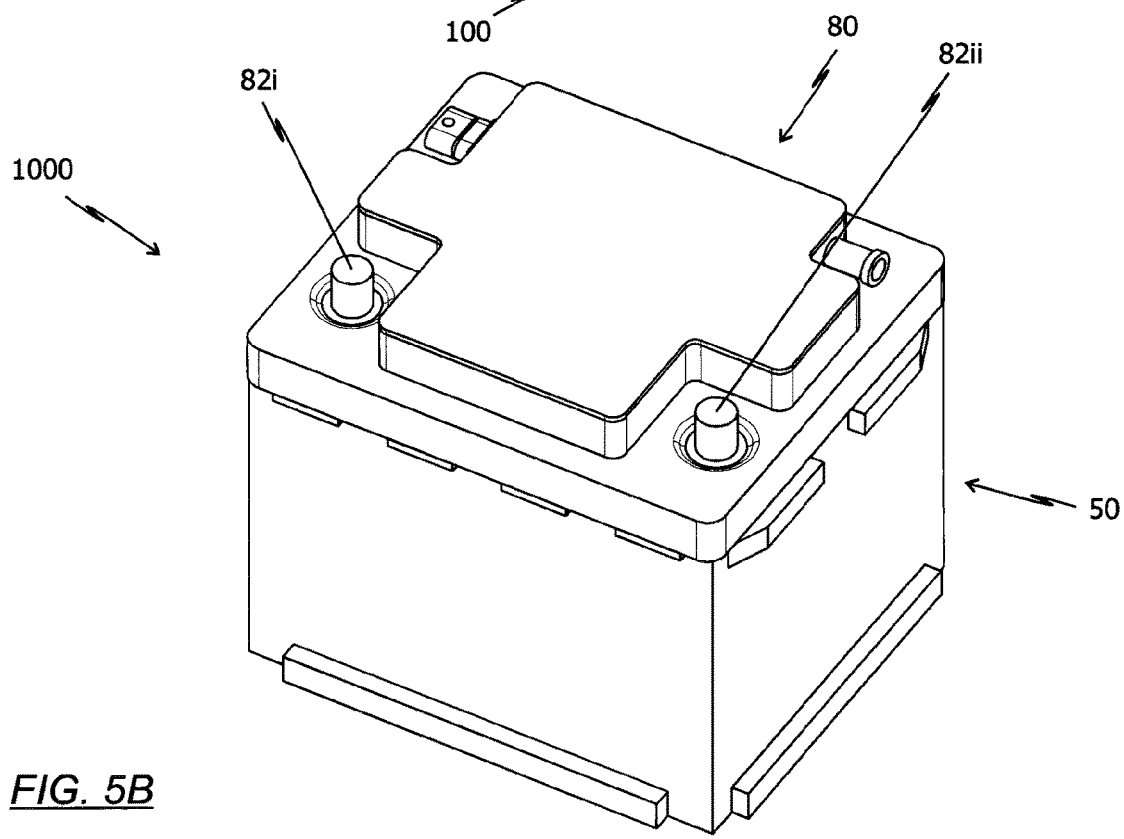
FIG. 5B is a perspective view of the energy storage module.

FIG. 5B is a perspective view of the energy storage module 1000 once assembled. Therein, the cover element 80 comprises a receiving portion for the two main terminals 82i, 82ii of the energy storage module 1000. Furthermore, the cover element 80 can be connected and secured to the housing 50 in order to provide a sealed energy storage module 1000 casing. Therefore, the cover element 80 may be welded, in particular laser welded or ultrasonically welded to the housing 50.

In a preferred embodiment, the energy storage module 1000 is a 12V lithium-ion starter battery, comprising four cell sub-modules 100 electrically connected in series and each comprising three stacked cell assemblies 1 electrically connected in parallel as described above.

It should be understood that the invention is not limited in its application to the details of construction and arrangements of the components set forth herein. In more detail, depending upon the desired voltage and/or capacity of the energy storage module 1000, any suitable number of cell sub-modules 100 or cell assemblies 1 can be used in order to meet the desired demands.

The technical effects and technical problems in the specification are exemplary and are not limiting. It should be noted that the embodiments described in the specification may have other technical effects and may have other technical problems.

While only certain features and embodiments of the invention have been illustrated and described, many modifications and changes may occur to those skilled in the art (e.g. variations and sizes, dimensions, structures, shapes, proportions of the various elements, values of parameters, mounting arrangements, use of materials, colors orientations, etc.) without materially departing from the novel teachings and advantageous of the subject-matter recited in the claims. The order or sequence of any process or method steps may be varied or re-sequenced according to alternative embodiments.

REFERENCE SIGNS 1 cell assembly
10 lithium-ion pouch cell
12i, 12ii (cell) terminal
20 cell frame
22i, 22ii (cell) bus bar
24 thermal plate
24i top portion of thermal plate
24ii bottom portion of thermal plate
30 compression element
40 adhesive
50 housing
50i thermal management feature
52 internal partition of housing
60 bimetallic plate
60i, 60ii positive/negative end connection pieces (of bimetallic plate)
70 sense line
80 cover element
82i, 82ii main terminals
100 cell sub-module
1000 energy storage module

The invention claimed is:
1. A cell assembly, comprising:
a cell frame, bus bars and a thermal plate, the bus bars and the thermal plate being integrated into the cell frame, the cell frame including a top wall and a bottom wall, the bus bars being in-molded into the top wall of the cell frame;
a lithium-ion pouch cell comprising:
a first face;
a second face opposite the first face;
a positive cell terminal; and
a negative cell terminal, the positive cell terminal and the negative cell terminal being arranged at a top end of the pouch cell, the positive cell terminal and the negative cell terminal each being pre-bent substantially at a right angle respective to the first face of the pouch cell; and
a compression element;
the cell frame being configured to receive and house the pouch cell and the compression element in a space defined by the thermal plate and the cell frame;
the thermal plate including a bottom portion which extends through the bottom wall of the cell frame; and
the top wall of the cell frame including geometric features for supporting corresponding placement of the positive cell terminal and the negative cell terminal, the geometric features including a plurality of recesses, the plurality of recesses being shaped to receive the positive cell terminal and the negative cell terminal.

2. The cell assembly according to claim 1, wherein the thermal plate is in-molded in the cell frame.

3. The cell assembly according to claim 1, wherein the compression element comprises at least one foam layer.

4. The cell assembly of claim 1, wherein the cell terminals are welded to the bus bars.

5. The cell assembly according to claim 1, wherein the pouch cell is secured to the thermal plate by one of a supported adhesive layer and a non-supported adhesive layer, which is at least partially applied on the thermal plate.

6. The cell assembly according to claim 1, wherein the bus bars comprise a Cu-bus bar for coupling to the negative cell terminal of the pouch cell and an Al-bus bar for coupling to the positive cell terminal of the pouch cell.

7. A cell sub-module comprising at least two cell assemblies, each of the at least two cell assemblies comprising:
a cell frame, bus bars and a thermal plate, the bus bars and the thermal plate being integrated into the cell frame, the cell frame including a top wall and a bottom wall, the bus bars being in-molded into the top wall of the cell frame;
a lithium-ion pouch cell comprising:
a first face; and
a second face opposite the first face;
a positive cell terminal; and
a negative cell terminal, the positive cell terminal and the negative cell terminal being arranged at a top end of the pouch cell, the positive cell terminal and the negative cell terminal each being pre-bent substantially at a right angle respective to the first face of the pouch cell; and
a compression element;
the cell frame being configured to receive and house the pouch cell and the compression element in a space defined by the thermal plate and the cell frame;
the thermal plate including a bottom portion which extends through the bottom wall of the cell frame;
the top wall of the cell frame including geometric features for supporting corresponding placement of the positive cell terminal and the negative cell terminal, the geometric features including a plurality of recesses, the plurality of recesses being shaped to receive the positive cell terminal and the negative cell terminal; and
the at least two cell assemblies being stacked such that the thermal plate of a first cell assembly of the at least two cell assemblies contacts the compression element of an adjacent cell assembly of the at least two cell assemblies, and such that the cell terminals of each cell assembly are arranged on a first side of the cell sub-module.

8. The cell sub-module according to claim 7, wherein the at least two cell assemblies comprises three cell assemblies.

9. An energy storage module, comprising:
a housing having a thermal management feature;
a plurality of cell sub-modules arranged in the housing, each sub-cell module of the plurality of cell sub-modules comprising:
at least two cell assemblies, each of the at least two cell assemblies comprising:
a cell frame, bus bars and a thermal plate, the bus bars and the thermal plate being integrated into the cell frame, the cell frame including a top wall and a bottom wall, the bus bars being in-molded into the top wall of the cell frame;
a lithium-ion pouch cell comprising:
a first face; and
a second face opposite the first face;
a positive cell terminal; and
a negative cell terminal, the positive cell terminal and the negative cell terminal being arranged at a top end of the pouch cell, the positive cell terminal and the negative cell terminal each being pre-bent substantially at a right angle respective to the first face of the pouch cell; and
a compression element;
the cell frame being configured to receive and house the pouch cell and the compression element in a space defined by the thermal plate and the cell frame;
the thermal plate including a bottom portion which extends through bottom wall of the cell frame; and
the top wall of the cell frame including geometric features for supporting corresponding placement of the positive cell terminal and the negative cell terminal, the geometric features including a plurality of recesses, the plurality of recesses being shaped to receive the positive cell terminal and the negative cell terminal; and
the at least two cell assemblies being stacked such that the thermal plate of a first cell assembly of the at least two cell assemblies contacts the compression element of an adjacent cell assembly of the at least two cell assemblies, and such that the cell terminals of each cell assembly are arranged on a first side of the cell sub-module; and
the housing comprising a plurality of cavities, each configured to receive a corresponding one of the plurality of cell sub-modules, the cavities being defined by one of at least one wall of the housing and an internal partition of the housing by at least two internal partitions of the housing.

10. The energy storage module according to claim 9, wherein the housing of the energy storage module is configured to be closed by a cover element.

11. The energy storage module according to claim 9, wherein the energy storage module is a 12 volt lithium-ion starter battery, the plurality of cell sub-modules comprising four cell sub-modules, each of the at least two cell assemblies of each of the plurality of cell sub-modules comprising three cell assemblies.

12. The energy storage module according to claim 9, further comprising a sense line for measuring at least one of the voltage of a cell assembly of the at least two cell assemblies of at least one cell sub-module of the plurality of cell sub-modules.

13. The energy storage module according to claim 12, wherein the sense line further comprises at least one temperature sensor integrated into the sense line.

14. The energy storage module according to claim 9, wherein the bus bars of two adjacent cell sub-modules of the plurality of the cell sub-modules are connected to each other by bimetallic plate such that the two adjacent cell sub-modules are electrically connected in series, wherein the respective cell assemblies of each cell sub-module are simultaneously electrically connected in parallel to each other.

15. The energy storage module according to claim 14, wherein the bus bars comprise a Cu-bus bar and an Al-bus bar, and wherein the bimetallic plate comprises a Cu-portion for connecting to the Cu-bus bar of the negative cell terminal and an Al-portion for connecting to the Al-bus bar of the positive cell terminal.

* * * * *